United States Patent
Jimenez et al.

(10) Patent No.: US 10,297,863 B2
(45) Date of Patent: May 21, 2019

(54) ELECTROLYTE ADDITIVE AND METAL INCLUDED IN COMPOSITE ELECTRODE CONTAINING MG, AL, CU, AND CR FOR ALKALI METAL STORAGE SYSTEM

(71) Applicant: Bayerische Motoren Werke Aktiengesellschaft, Munich (DE)

(72) Inventors: Antonia Reyes Jimenez, Muenster (DE); Martin Winter, Muenster (DE); Johannes Kasnatscheew, Duelmen (DE); Marius Amereller, Muenster (DE); Raphael Wilhelm Schmitz, Leverkusen (DE); Ralf Wagner, Muenster (DE); Dennis Gallus, Muenster (DE); Benjamin Streipert, Muenster (DE); Bjoern Hoffmann, Muenster (DE); Stephan Roeser, Muenster (DE); Juan Pablo Badillo Jimenez, Muenster (DE); Vadim Kraft, Nordwalde (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 61 days.

(21) Appl. No.: 15/483,357

(22) Filed: Apr. 10, 2017

(65) Prior Publication Data
US 2017/0214089 A1 Jul. 27, 2017

Related U.S. Application Data

(63) Continuation of application No. PCT/EP2015/070374, filed on Sep. 7, 2015.

(30) Foreign Application Priority Data

Oct. 9, 2014 (DE) .................. 10 2014 220 504

(51) Int. Cl.
*H01M 4/36* (2006.01)
*H01M 4/131* (2010.01)
(Continued)

(52) U.S. Cl.
CPC ....... *H01M 10/0567* (2013.01); *H01M 4/131* (2013.01); *H01M 4/1391* (2013.01);
(Continued)

(58) Field of Classification Search
CPC .......... H01M 10/0567; H01M 10/052; H01M 10/0568; H01M 10/0525; H01M 4/131; H01M 4/1391; H01M 4/505; H01M 4/525
(Continued)

(56) References Cited

U.S. PATENT DOCUMENTS

| 6,489,060 B1 | 12/2002 | Zhang et al. |
| 2005/0164085 A1* | 7/2005 | Bofinger ................ C01G 45/02 429/224 |

(Continued)

FOREIGN PATENT DOCUMENTS

| DE | 600 36 154 T2 | 5/2008 |
| DE | 10 2014 202 156 A1 | 8/2015 |

(Continued)

OTHER PUBLICATIONS

Ubukawa, Satoshi, Machine Translation of JP-H0793140-B2, Oct. 1995 (Year: 1995).*

(Continued)

*Primary Examiner* — Sean P Cullen
(74) *Attorney, Agent, or Firm* — Crowell & Moring LLP

(57) ABSTRACT

An alkali metal-based energy storage system, having at least one composite electrode containing an active material, and an electrolyte containing a lithium salt dissolved in an aprotic organic solvent, an ionic fluid and/or a polymer
(Continued)

matrix. The electrolyte further contains an additive selected from a cation or a compound of a metal selected from Mg, Al, Cu and/or Cr. The metal selected from Mg, Al, Cu and/or Cr is applied onto the active material and/or the active material of the composite electrode is partially replaced by the metal selected from Mg, Al, Cu and/or Cr in the form of a metal powder or a metal salt.

15 Claims, 13 Drawing Sheets

(51) Int. Cl.
    *H01M 4/505* (2010.01)
    *H01M 4/525* (2010.01)
    *H01M 10/052* (2010.01)
    *H01M 4/1391* (2010.01)
    *H01M 10/0525* (2010.01)
    *H01M 10/0567* (2010.01)
    *H01M 10/0568* (2010.01)

(52) U.S. Cl.
    CPC .......... *H01M 4/505* (2013.01); *H01M 4/525* (2013.01); *H01M 10/052* (2013.01); *H01M 10/0525* (2013.01); *H01M 10/0568* (2013.01); *H01M 4/364* (2013.01); *H01M 4/366* (2013.01); *H01M 2300/0025* (2013.01); *H01M 2300/0045* (2013.01); *H01M 2300/0085* (2013.01)

(58) Field of Classification Search
    USPC ............... 429/188, 231.6, 220, 218.1, 231.1, 429/231.95, 319, 322
    See application file for complete search history.

(56) References Cited

U.S. PATENT DOCUMENTS

2006/0204846 A1    9/2006    Sunagawa et al.
2011/0189548 A1    8/2011    Xu
2012/0208070 A1*   8/2012    Nakashima ......... H01M 2/1646
                                                   429/158
2014/0045055 A1*   2/2014    Nakano ................ H01M 4/505
                                                   429/188
2015/0295277 A1*  10/2015   Takahashi ............. H01M 4/62
                                                   429/336
2016/0365567 A1   12/2016   Troegel et al.

FOREIGN PATENT DOCUMENTS

| EP | 1 056 143 A2 | 11/2000 | | |
|---|---|---|---|---|
| JP | 04349365 A | * 12/1992 | | |
| JP | H0793140 B2 | * 10/1995 | ............ | H01M 6/162 |
| WO | WO 2005/031892 A2 | 4/2005 | | |
| WO | WO 2009/148890 A1 | 12/2009 | | |
| WO | WO-2012147778 A1 | * 11/2012 | ............ | H01M 4/505 |
| WO | WO-2014080945 A1 | * 5/2014 | .............. | H01M 4/62 |

OTHER PUBLICATIONS

Wikipedia contributors. "Anode." Wikipedia, The Free Encyclopedia. Wikipedia, The Free Encyclopedia, Sep. 25, 2018. Web. Nov. 16, 2018. (Year: 2018).*

International Search Report (PCT/ISA/210) issued in PCT Application No. PCT/EP2015/070374 dated Nov. 4, 2015 with English-language translation (four (4) pages).

German-language Written Opinion (PCT/ISA/237) issued in PCT Application No. PCT/EP2015/070374 dated Nov. 4, 2015 (six (6) pages).

German Search Report issued in counterpart German Application No. 10 2014 220 504.2 dated Aug. 14, 2015 with partial English-language translation (thirteen (13) pages).

Kang Y. C., et al., "Nano-Sized MgO Particles Ranging from 13 to 28 nm Synthesized by Spray Pyrolysis," Journal of Ceramic Processing Research, 2008, vol. 9, No. 2, pp. 140-145 (Six (6) pages).

* cited by examiner

ELECTROLYTE ADDITIVE AND METAL INCLUDED IN COMPOSITE ELECTRODE CONTAINING MG, AL, CU, AND CR FOR ALKALI METAL STORAGE SYSTEM

CROSS REFERENCE TO RELATED APPLICATIONS

This application is a continuation of PCT International Application No. PCT/EP2015/070374, filed Sep. 7, 2015, which claims priority under 35 U.S.C. § 119 from German Patent Application No. 10 2014 220 504.2, filed Oct. 9, 2014, the entire disclosures of which are herein expressly incorporated by reference.

BACKGROUND AND SUMMARY OF THE INVENTION

The invention relates to the field of alkali metal-based, preferably lithium-based, energy storage systems, more particularly lithium-ion batteries with stability to high voltages.

Lithium-ion batteries currently represent the leading technology in the field of rechargeable batteries. Lithium-ion batteries are currently used particularly in portable electronics, and lithium-ion batteries for larger systems such as electric vehicles are in development. A conductive salt currently used in commercially available lithium-ion batteries is lithium hexafluorophosphate ($LiPF_6$). In this case the conductive salt is in solution in a nonaqueous solvent, usually a mixture of carbonates.

A disadvantage of the conventional electrolytes based on lithium hexafluorophosphate in carbonates lies in particular in the low oxidative stability of 4.5 V against $Li/Li^+$. The electrolyte is stable only up to this voltage, while outside of this range there is oxidative decomposition of the electrolyte and, in association therewith, dissolution of the cathode material. For lithium-ion batteries with high energy density or high power density as well, which preferably use lithium nickel manganese cobalt mixed oxides (NMC), or lithium nickel manganese oxide (LNMO) as active material for the cathodic electrode, electrolyte decomposition and cathode-material dissolution occur at end-of-charge voltages above 4.4 V or 4.7 V, respectively. The consequence is a low cycling stability and hence short lifetime of the battery.

In order to improve the lifetime at elevated temperature, EP 1 056 143, for example, proposes using composite cathodes produced from a lithium manganese oxide suspension combined with extraneous-metal compounds, such as $Mg(NO_3)_2$. The suspension is applied to the collector and cured above the decomposition temperature of the metal compound at 350° C., for example. It is known, from Kang Y. C. et al., Journal of Ceramic Processing Research, vol. 9, No. 2, pp. 140-145 (2008), for example, that $Mg(NO_3)_2$ exhibits an endothermic peak in the DSC at 330° C., which is indicative of decomposition or conversion to MgO.

It is therefore an object of the invention to provide means suitable for improving the cycling stability or lifetime of an alkali metal-ion battery, more particularly lithium-ion battery, with elevated end-of-charge potentials.

This and other objects of the invention are achieved by means of an alkali metal-based, more particularly lithium-based, energy storage system having at least one composite electrode, more particularly a composite cathode, having an active material, and an electrolyte having an alkali metal salt, more particularly a lithium salt, dissolved in solution with an aprotic organic solvent, an ionic liquid and/or a polymer matrix. The electrolyte also includes an additive selected from a cation or a compound of a metal selected from Mg, Al, Cu and/or Cr. In one aspect, the active material of the cathode bears a metal selected from Mg, Al, Cu and/or Cr applied by sputtering. In another aspect, the active material of the composite electrode, more particularly composite cathode, is partially replaced by a metal selected from Mg, Al, Cu and/or Cr in the form of a metal powder or metal salt.

Surprisingly it has been found that the addition of a metal cation selected from Mg, Al, Cu and/or Cr and/or the sputter deposition of Mg, Al, Cu or Cr onto the cathode, and/or the partial replacement of the active material of the composite electrode, more particularly composite cathode, by a metal selected from Mg, Al, Cu and/or Cr in the form of a metal powder or a metal salt, is able to provide a higher cycling stability and a longer lifetime of an alkali metal battery, more particularly of a lithium-ion battery. This makes it possible for the battery to be charged up to higher end-of-charge potentials, without destruction of the individual cell components containing a cathode, an anode, and an electrolyte. As a result, the stability window and hence operational window of the battery is enlarged. A particular advantage in this case is that the higher potentials that are enabled result in a higher energy density of the battery. Moreover, the self-discharge, which constitutes one of the greatest problems when using lithium nickel manganese oxide (LNMO) as cathode active material, is considerably reduced.

The effect of adding Mg, Al, Cu and/or Cr may be achieved firstly by the addition in the form of electrolyte additive, secondly by application, more particularly sputter deposition, of the metal onto the cathode active material, and lastly by partial replacement of the active material of the composite electrode, more particularly composite cathode, by a metal selected from Mg, Al, Cu and/or Cr in the form of a metal powder or a metal salt, preferably Mg, for example, $MgSO_4$, during the production of the composite electrode, more particularly a composite cathode, from a current collector and an active-material suspension.

One aspect of the invention relates to an electrolyte for an alkali metal-based, more particularly lithium-based, energy storage system, having at least one alkali metal salt, more particularly a lithium salt, dissolved in solution with an aprotic organic solvent, an ionic liquid and/or a polymer matrix, and at least one additive selected from a cation or a compound of a metal selected from Mg, Al, Cu and/or Cr. A cell containing an electrolyte having an additive of the invention may advantageously exhibit lower impedance than a corresponding cell without the additive. It has been found, moreover, that the capacity decrease at elevated charge and discharge rates was reduced. Without being bound to any particular theory, it is assumed that the addition of the additive leads to the formation of a passivating layer on the cathode. This layer is able to protect electrode and electrolyte from decomposition. It is further assumed that the metals of the invention in the form of cations are irreversibly inserted into the respective cathode materials and protect the material from degradation.

Magnesium, aluminum, copper, and chromium may be added in the form of salt like, inorganic or organic compounds to the electrolyte. The cation is present preferably with a counterion, which also serves as anion of a conductive salt. In preferred embodiments, the metal selected from Mg, Al, Cu and/or Cr is present as a cation of a magnesium, aluminum, copper and/or chromium salt in conjunction with an anion selected from $AsF_6^-$, $ClO_4^-$, $SbF_6^-$, $PtCl_6^-$, $AlCl_4^-$, $GaCl_4^-$, $SCN^-$, $AlO_4^-$, $CF_3CF_2SO_3^-$, $(CF_3)SO_3^-$, $C(SO_2CF_3)_3^-$, $PF_6^-$, $PF_3(CF_3)_3^-$ (FAP), $PF_4(C_2O_4)^-$, $BF_4^-$, $B(C_2O_4)_2^-$, $BF_2(C_2O_4)^-$, $B(C_2O_4)(C_3O_4)^-$, $(C_2F_5BF_3)^-$ (FAB), $B_{12}F_{12}^{2-}$, $N(SO_2CF_3)_2^-$, $N(FSO_2)_2^-$ and/or $N(SO_2C_2F_5)_2^-$. More particularly, Mg, Al, Cu, and Cr may be used as a mixture of a lithium-based conductive salt with a magnesium-, aluminum-, copper- or chromium-based conductive salt. Advantageously, therefore, the high-voltage stability of alkali metal-based, more particularly lithium-based, secondary batteries, or accumulators, can be improved, while likewise the conductivity of the electrolyte is supported. The anion is preferably selected from bis(trifluoromethanesulfonyl)imide (TFSI), bis(fluorosulfonyl)imide (FSI), hexafluorophosphate, hexafluoroarsenate, perchlorate, tetrafluoroborate, difluoromono(oxalate)borate, bioxalatoborate and/or trifluoromethanesulfonate (Tf). Mg, Al, Cu, and Cr may be present more particularly in the form of a sulfonylimide salt or sulfonate salt.

As used herein, the term "additive" refers to a material or compound which is added to the electrolyte in just a small amount, more particularly in an amount of not greater than 10 wt %, based on the total electrolyte weight. In preferred embodiments, the electrolyte includes the magnesium, aluminum, copper and/or chromium salt in the range from ≥0.1 ppm to ≤10 wt %, preferably in the range from ≥0.01 wt % to ≤5 wt %, more preferably in the range from ≥0.1 wt % to ≤2 wt %, based on a total electrolyte weight of 100 wt %. For example, the electrolyte may contain 0.7 wt % or 1 wt % of the magnesium, aluminum, copper and/or chromium salt. As defined herein, 1 ppm (parts per million) stands for 0.0001 wt %. It has been observed that even amounts of 0.1 wt % or 0.7 wt % of the metal salt were sufficient for a decrease in capacity loss with increasing number of cycles (capacity fading). Good effects were achieved in particular in the range from between ≥0.1 wt % to ≤1 wt %.

The electrolyte may in particular contain a magnesium salt or aluminum salts as an additive. In preferred embodiments, the electrolyte contains magnesium(II) bis (trifluoromethanesulfonyl)imide (mgTFSI$_2$) or aluminum(III) trifluoromethanesulfonate (AlTf$_3$). It has been observed that these salts as electrolyte additive gave particularly good improvements in the cycling stability.

In another aspect, the electrolyte includes an alkali metal salt, more particularly a lithium salt, dissolved in solution with an aprotic organic solvent, an ionic liquid and/or a polymer matrix.

Examples of the organic solvent may be selected from ethylene carbonate, propylene carbonate, diethyl carbonate, dimethyl carbonate, ethyl methyl carbonate, acetonitrile, glutaronitrile, adiponitrile, pimelonitrile, gamma-butyrolactone, gamma-valerolactone, dimethoxyethane, 1,3-dioxalane, methyl acetate, ethyl methanesulfonate, dimethyl methyl phosphonate, and/or a mixture thereof. Suitable organic solvents are from cyclic carbonates such as ethylene carbonate and propylene carbonate and/or linear carbonates such as diethyl carbonate, dimethyl carbonate, and ethyl methyl carbonate. Preferably, the organic solvent is selected from ethylene carbonate, diethyl carbonate, dimethyl carbonate, ethyl methyl carbonate and/or mixtures thereof. Also preferred are binary mixtures of carbonates, more particularly of ethylene carbonate with a further carbonate such as ethyl methyl carbonate, diethyl carbonate, or dimethyl carbonate.

Further preferred solvents are ionic liquids. These liquids have high thermal and electrochemical stability and also good ionic conductivity. Preferred ionic liquids has a cation selected from 1-ethyl-3-methylimidazolium (EMI$^+$), 1,2-dimethyl-3-propylimidazolium (DMPI$^+$), 1,2-diethyl-3,5-dimethylimidazolium (DEDMI$^+$), trimethyl-n-hexylammonium (TMHA$^+$), N-alkyl-N-methylpyrrolidinium (PYR$_{IR}^+$), N-alkyl-N-methylpiperidinium (PIP$_{IR}^+$) and/or N-alkyl-N-methylmorpholinium (MORP$_{IR}^+$), and an anion selected from bis(trifluoromethanesulfonyl)imide (TFSI), bis(pentafluoroethanesulfonyl)imide (BETI$^-$), bis(fluorosulfonyl)imide (FSI$^-$), 2,2,2-trifluoro-N-(trifluoromethanesulfonyl)acetamide (TSAC$^-$), tetrafluoroborate (BF$_4^-$), pentafluoroethanetrifluoroborates (C$_2$F$_5$BF$_3^-$), hexafluorophosphate (PF$_6^-$) and/or tris(pentafluoroethane)trifluorophosphate (((C$_2$F$_5$)$_3$PF$_3^-$). Preferred N-alkyl-N-methylpyrrolidinium (PYR$_{IR}^+$) cations are selected from N-butyl-N-methylpyrrolidinium (PYR$_{14}^+$) and/or N-methyl-N-propylpyrrolidinium (PYR$_{13}^+$). Preferred ionic liquids are selected from N-butyl-N-methylpyrrolidinium bis(trifluoromethanesulfonyl)imide (PYR$_{14}$TFSI) and/or N-methyl-N-propylpyrrolidinium bis (trifluoromethanesulfonyl)imide (PYR$_{13}$TFSI).

Further suitable are polymer electrolytes, in which case the polymer electrolyte may take the form of a gel polymer electrolyte or solid polymer electrolyte. Solid polyelectrolytes allow a solvent-free construction which is easy to produce and diverse in its form. Furthermore, the energy density can be increased, since only a thin polymer film is required between the electrodes. Solid electrolytes in general are chemically and electrochemically stable toward electrode materials, and also do not escape from the cell.

Gel polymer electrolytes usually include an aprotic solvent and a polymer matrix. Examples of preferred polymers for solid polymer electrolytes and gel polymer electrolytes include homo- or copolymers of polyethylene oxide (PEO), polypropylene oxide (PPO), polyvinylidene fluoride (PVdF), polyvinylidene fluoride-hexafluoropropylene (PVdF-HFP), polyacrylonitrile (PAN), polymethyl methacrylate (PMMA), polyethyl methacrylate (PEMA), polyvinyl acetate (PVAc), polyvinyl chloride (PVC), polyphosphazene, polysiloxanes, polyvinyl alcohol (PVA) and/or homo- and (block) copolymers having functional side chains selected from ethylene oxide, propylene oxide, acrylonitrile and/or siloxanes.

Examples of lithium salts with conductive salt suitability include LiAsF$_6$, LiClO$_4$, LiSbF$_6$, LiPtCl$_6$, LiAlCl$_4$, LiGaCl$_4$, LiSCN, LiAlO$_4$, LiCF$_3$CF$_2$SO$_3$ Li(CF$_3$)SO$_3$, (LiTf), LiC(SO$_2$CF$_3$)$_3$, phosphate-based lithium salts such as LiPF$_6$, LiPF$_3$(CF$_3$)$_3$ (LiFAP), and LiPF$_4$(C$_2$O$_4$) (LiTFOB), borate-based lithium salts such as LiBF$_4$, LiB(C$_2$O$_4$)$_2$ (LiBOB), LiBF$_2$(C$_2$O$_4$) (LiDFOB), LiB(C$_2$O$_4$)(C$_3$O$_4$) (LiMOB), Li(C$_2$F$_5$BF$_3$) (LiFAB), and L$_{12}$B$_{12}$F$_{12}$ (LiDFB) and/or lithium salts of sulfonylimides, preferably LiN(SO$_2$CF$_3$)$_2$ (LiTFSI) and/or LiN(SO$_2$C$_2$F$_5$)$_2$ (LiBETI). A preferred lithium salt is LiPF$_6$. The concentration of the lithium salt in the electrolyte may be in the range from ≥0.5 M to ≤2.5 M, preferably in the range from ≥0.8 M to ≤1.5 M, more particularly in the range from ≥0.9 M to ≤1.5 M. The electrolyte is prepared by introducing the lithium salt and the additive into the solvent.

Another aspect of the invention relates to an electrode, more particularly a cathode, for an alkali metal-based, more particularly lithium-based, energy storage system, including a support bearing at least one applied or deposited active material, the active material bearing an applied metal selected from Mg, Al, Cu and/or Cr and/or the active material of the composite electrode, more particularly composite cathode, being partially replaced by a metal selected from Mg, Al, Cu and/or Cr in the form of a metal powder or a metal salt. In one aspect, the metal may have been applied to the active material by sputtering.

As used herein, the term "cathode" refers to an electrode which accepts electrons on connection to a consumer. The cathode in this case, is also referred to as the "positive electrode". As used herein, the term "active material" is a material which is able to accept and give up lithium ions reversibly, a process referred to as "insertion". The active material therefore participates "actively" in the electrochemical reactions which take place during charging and discharging, in contrast to other possible constituents of an electrode such as binder, conductive carbon, or support. The active material is customarily applied to a metal foil support, as for example a copper or aluminum foil, or to a carbon-based current collector foil, functioning as a current collector.

The application, more particularly the sputter deposition, of a metal selected from Mg, Al, Cu and/or Cr onto the cathode may advantageously also improve the compatibility of electrode and electrolyte in the case of increased end-of-charge potentials. Without being tied to any particular theory, it is assumed that the sputter application of the metal likewise results in formation on the cathode of a passivating layer which protects the electrode and the electrolyte from decomposition.

It is understood that the layer of metal applied to the cathode by sputtering or otherwise is not continuous, so that the charging and discharging operations are unaffected. The surface of the cathode may be covered partially with a metal selected from Mg, Al, Cu and/or Cr, in the form, for example, of thin-film metal dots. Dot structures or similar structures of this kind can be applied to the active material by sputtering, using corresponding masks. The diameter of the metal dots may be in the range ≤12 mm, preferably in the range from ≥1 m to ≤6 mm, more particularly in the range from ≥0.1 mm to ≤5 mm, as an example at 3 mm, 2 mm or 1 mm. The layer thickness of the metal dots may be in the range of ≤5 m, preferably in the range from ≥50 nm to ≤5000 nm, more particularly in the range from ≥500 nm to ≤1000 nm. The sputter-applied metal dots in particular do not influence the normal charging and discharging operations. This has the advantage that there is no resultant adverse effect on normal battery operations.

Advantageously, the partial replacement of the cathode active material by a metal selected from Mg, Al, Cu and/or Cr in the form of a metal powder or a metal salt, more particularly by partial replacement of the active material in the suspension of the composite electrode, more particularly composite cathode, during the production of the composite electrode, more particularly composite cathode, may also reduce the capacity attenuation of the lithium energy storage system, may reduce self-discharge, and may reduce the overall internal resistance of the lithium energy storage system. In contrast to EP 1 056 143, however, the suspension is not heated to a temperature above the decomposition temperature of the metal powder or metal salt. Instead there is only drying under reduced pressure, such as oil-pump vacuum, for example. Additionally, preferably, the suspension is heated. For this purpose, it is possible to use a temperature of 30 to 330° C., more preferably 80 to 290° C., especially preferably 100 to 150° C. In this way there is no decomposition or conversion of the metal powder or metal salt into magnesium oxide. The metal powder or the metal salt is therefore still in the form of a metal powder or metal salt in the completed composite electrode, alongside the active material. The metal, preferably magnesium, may be present in an amount of 0.1 to 10 wt %, preferably 0.5 to 5 wt %, especially preferably 1 to 3 wt %, based on the cathode active material in the cathode.

The active material may be selected from lithium or from lithium metal oxides or lithium metal phosphates such as $LiCoO_2$ (LCO), $LiNiO_2$, $LiNiCoO_2$, $LiNiCoAlO_2$ (NCA), $LiNiCoMnO_2$, $LiMn_2O_4$ spinel, $LiFePO_4$ (LFP), $LiMnPO_4$, $LiCoPO_4$, or $LiNiPO_4$. In preferred embodiments, the active material is selected from lithium nickel manganese cobalt mixed oxide (NMC), lithium nickel manganese oxide (LNMO) and/or lithium-rich transition-metal oxides of type $(Li_2MnO_3)_x(LiMO_2)_{1-x}$ (Li-rich layered transition metal oxides of the $(Li_2MnO_3)_x(LiMO_2)_{1-x}$ type). These compounds provide a cathode active material which is stable with respect to high voltage. Lithium nickel manganese cobalt mixed oxide (NMC) is a highly promising material for 4 V batteries, lithium nickel manganese oxide (LNMO) for 5 V batteries. Lithium nickel manganese oxide (LNMO) is present in spinel structure.

Counterelectrodes used in lithium-based energy storage systems may be anodes based on materials such as graphite, lithium, silicon, tin, or lithium titanate.

A further aspect the invention relates to a method for increasing the cycling stability of an alkali metal-based, more particularly lithium-based, energy storage system having a composite electrode, more particularly a composite cathode, having an active material, and an electrolyte containing a lithium salt dissolved in solution with an aprotic organic solvent, an ionic liquid and/or a polymer matrix. The electrolyte is admixed with an additive selected from a cation or a compound of a metal selected from Mg, Al, Cu and/or Cr, and/or the metal selected from Mg, Al, Cu and/or Cr is applied to the active material of the cathode. Examples of the active material include lithium nickel manganese cobalt mixed oxide (NMC), lithium metal manganese oxide (LNMO) and/or lithium-rich transition-metal oxides of type $(Li_2MnO_3)_x(LiMO_2)_{1-x}$. In another aspect, the active material of the composite electrode, more particularly composite cathode, is partially replaced by a metal selected from Mg, Al, Cu and/or Cr in the form of a metal powder or a metal salt.

The additive selected from a cation or a compound of a metal selected from Mg, Al, Cu and/or Cr may be added in the form of salt like, inorganic or organic compounds to the electrolyte, preferably with a counterion which also serves as anion of a conductive salt. The metal selected from Mg, Al, Cu and/or Cr is present preferably as a cation in conjunction with an anion selected from $AsF_6^-$, $ClO_4^-$, $SbF_6^-$, $PtCl_6^-$, $AlCl_4^-$, $GaCl_4^-$, $SCN^-$, $AlO_4^-$, $CF_3CF_2SO_3^-$, $(CF_3)SO_3^-$, $C(SO_2CF_3)_3^-$, $PF_6^-$, $PF_3(CF_3)_3^-$ (FAP), $PF_4(C_2O_4)^-$, $BF_4^-$, $B(C_2O_4)_2^-$, $BF_2(C_2O_4)^-$, $B(C_2O_4)(C_3O_4)^-$, $(C_2F_5BF_3)^-$, (FAB), $B_{12}F_{12}^{2-}$, $N(SO_2CF_3)_2^-$, $N(FSO_2)_2^-$ and/or $N(SO_2C_2F_5)_2^-$. In particular, Mg, Al, Cu, and Cr may be added as a mixture of a lithium-based conductive salt with a magnesium-, aluminum-copper- or chromium-based conductive salt. The anion is preferably selected from bis(trifluoromethanesulfonyl)imide (TFSI), bis(fluorosulfonyl)imide (FSI), hexafluorophosphate, hexafluoroarsenate, perchlorate, tetrafluoroborate, difluoromono(oxalato)borate, bioxalatoborate and/or trifluoromethanesulfonate (Tf). In particular, Mg, Al, Cu, and Cr may be added in the form of a sulfonylimide salt or a sulfonate salt. Preferred salts are magnesium (II) bis(trifluoromethanesulfonyl)imide ($MgTFSI_2$) and aluminum (III) trifluoromethanesulfonate ($AlTf_3$). The additive may be dissolved like a lithium salt in an aprotic organic solvent, an ionic liquid and/or a polymer matrix. The magnesium, aluminum, copper and/or chromium salt may be added in a concentration in the range from ≥0.1 ppm to ≤10 wt %, preferably in the range from ≥0.01 wt % to ≤5 wt %, more preferably in the range from ≥0.1 wt % to ≤2 wt %, as an example, of 0.7 wt % or 1 wt %, based on a total electrolyte weight.

In another aspect, a metal selected from Mg, Al, Cu and/or Cr may be applied onto the active material of the cathode. The active material can be selected from lithium nickel manganese cobalt mixed oxide (NMC), lithium nickel manganese oxide (LNMO) and/or lithium-rich transition-metal oxides of type $(Li_2MnO_3)_x(LiMO_2)_{1-x}$. In another aspect, the active material of the composite electrode, more particularly composite cathode, may be partially replaced by a metal selected from Mg, Al, Cu and/or Cr in the form of a metal powder or a metal salt.

In one preferred embodiment, the metal selected from Mg, Al, Cu and/or Cr is applied by sputtering onto the active material of the cathode. It is understood that the layer of metal applied by sputtering or otherwise is not continuous, so as not to impact adversely on normal charging and discharging events. The sputter application of the metal takes place preferably in the form of thin-layer metal dots. In order to produce a dot pattern of this kind, the NCM coated substrate may be provided with a correspondingly perforated mask. The diameter of the metal dots may be 3 mm, 2 mm or 1 mm. The layer thickness of the metal dots may be in the range of ≤5 m, preferably in the range from ≥50 nm to ≤5000 nm, more particularly in the range from ≥500 nm to ≤1000 nm.

In one preferred embodiment, the active material of the composite electrode, more particularly composite cathode, may be partially replaced by a metal selected from Mg, Al, Cu and/or Cr in the form of a metal powder or a metal salt, by adding the metal powder or metal salt, preferably magnesium powder or magnesium salt, such as magnesium sulfate, to the active-material suspension instead of the active material, during the production of the cathode from a current collector and an active-material suspension. The metal powder or metal salt is added to the active material suspension in an amount of 0.1 to 10 wt %, preferably 0.5 to 5 wt %, especially preferably 1 to 3 wt %.

Examples of the alkali metal-based energy storage system include sodium battery, more particularly sodium air battery or sodium sulfur battery, lithium battery, lithium-ion battery, lithium-ion accumulator, lithium polymer battery and/or lithium-ion capacitor. As used herein, the term "energy storage system" embraces primary and secondary electrochemical energy storage apparatus, namely batteries (primary storage systems) and accumulators (secondary storage systems). In common linguistic usage, accumulators are frequently referred to using the term "battery", which is widely used as a generic term. Accordingly, the term "lithium-ion battery" is used synonymously with "lithium-ion accumulator". Presently, therefore, the term "lithium-ion battery" may likewise identify a "lithium-ion accumulator". The energy storage system is preferably a lithium-ion battery or lithium-ion accumulator.

Another aspect of the invention relates to the use of a metal selected from Mg, Al, Cu and/or Cr for increasing the cycling stability of an alkali metal-based, more particularly lithium-based, energy storage system, having a cathode, an anode, and an electrolyte containing a lithium salt dissolved in solution with an aprotic organic solvent, an ionic liquid and/or a polymer matrix. A cation or a compound of a metal selected from Mg, Al, Cu and/or Cr is used as an additive in the electrolyte, and/or the metal selected from Mg, Al, Cu and/or Cr is applied to the active material of the cathode. Examples of the active material include lithium nickel manganese cobalt mixed oxide (NMC), lithium nickel manganese oxide (LNMO) and/or lithium-rich transition-metal oxides of type $(Li_2MnO_3)_x(LiMO_2)_{1-x}$, and/or the active material in the composite electrode is partially replaced by a metal selected from Mg, Al, Cu and/or Cr in the form of a metal powder or a metal salt.

Alkali metal-based, more particularly lithium-based, energy storage systems in which Mg, Al, Cu and/or Cr are used as an additive in the electrolyte and/or as a sputter deposition, applied by sputtering, onto the active material and/or as a partial replacement of the active material in the composite electrode are suitable for all areas of application. Using, in particular, an active material of the cathode that is selected from lithium nickel manganese cobalt mixed oxide (NMC), lithium nickel manganese oxide (LNMO), and lithium-rich transition-metal oxides of type $(Li_2MnO_3)_x(LiMO_2)_{1-x}$, the energy storage systems are also suitable for high-voltage applications.

Other objects, advantages and novel features of the present invention will become apparent from the following detailed description of one or more preferred embodiments when considered in conjunction with the accompanying drawings.

DETAILED DESCRIPTION OF THE DRAWINGS

Example 1

Figure 1:
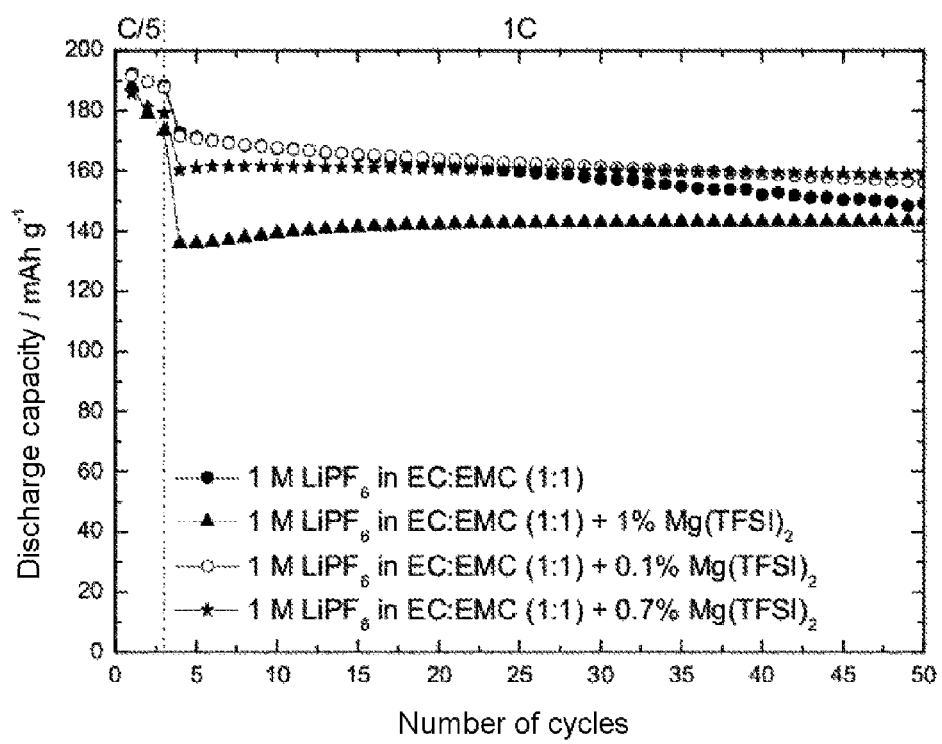
FIG. 1 shows the discharge capacity of a lithium-ion half-cell with 1 M lithium hexafluorophosphate ($LiPF_6$) in a solvent mixture of ethylene carbonate and ethyl methyl carbonate in equal mass fractions (EC:EMC 1:1 based on the mass), with and without addition of magnesium(II) bis (trifluoromethanesulfonyl)imide ($Mg(TFSI)_2$). The working electrode used was the cathode material nickel manganese cobalt oxide (NMC). The cell was charged to an end-of-charge potential of 4.6 V versus Li/Li.

Preparation of the Electrolyte Solutions:

The electrolyte mixtures were prepared in a glovebox with an H$_2$O and O$_2$ content below 0.5 ppm. All stated mixing ratios are based on the mass ratio (wt %).

An electrolyte containing 1 M LiPF$_6$ in EC:EMC (1:1) was prepared by initially introducing 50 wt % of ethylene carbonate (EC) and 50 wt % of ethyl methyl carbonate (EMC) and dissolving the required amount of LiPF$_6$ in this solvent mixture so as to give a concentration of 1 M LiPF$_6$. This electrolyte served as comparative electrolyte.

For preparing the additized electrolytes of the invention, the additives under investigation were added to this electrolyte mixture. The fraction in wt % of the respective additive (A) is based on the electrolyte (E) without additive, not on the overall electrolyte mixture including additive; i.e., w(A)=m(A)/m(E). The additives under investigation comprised magnesium(II) bis(trifluoromethanesulfonyl) imide (99.5%), copper(II) bis(trifluoromethanesulfonyl)imide, zinc(II) bis(trifluoromethanesulfonyl)imide, and Al(III) trifluoromethanesulfonate.

Before being used, the additives were dried under vacuum in a glass oven at 120° C. for at least 12 hours. The water content of the electrolytes according to Karl-Fischer was less than 20 ppm.

Electrochemical Investigations:

The experiments were conducted in a 3-electrode arrangement in modified Swagelok® T-pieces (tube connector, stainless steel body) with a nickel manganese cobalt oxide (NMC) electrode (12 mm diameter) or lithium nickel manganese oxide (LNMO) (12 mm diameter) as working electrode and with lithium foil (12 mm or 5 mm diameter, respectively) as counterelectrode and reference electrode. The internal cell constituents were insulated from the stainless steel housing by a polyester film. The electrodes were separated by a glass fiber filter which was impregnated with the corresponding electrolyte (200 μL). On account of the sensitivity of the cell components to hydrolysis and air, the cells were constructed in a glovebox.

Measurements at Constant Current:

The measurements at constant current were carried out on a Series 4000 battery tester (Maccor) at 20° C.±2° C. The NMC half-cells were cycled in the potential range from 3.0 V to 4.6 V versus Li/Li⁺. For the LMNO half-cells, a potential range of 3.0 V to 4.95 V versus Li/Li⁺ was selected.

The test plan employed was as follows: after three forming cycles with a charge and discharge rate (C and D rate) of C/5 (where 150 mAh g$^{-1}$ correspond to a C rate of 1 C), the cycling behavior was verified over 50 cycles with a charge and discharge rate of 1 C. This was followed by a D rate test. The cells were discharged at different D rates from D/5 to 5D and charged in each case at C/2. The D rates employed here were D/5, D/3, D/2, 1D, 2D, 3D, and 5D. After the D rate test came five cycles with charge and discharge rates of C/5, in order to verify whether the cathode material has suffered damage as a result of the loading test. The last phase included the test of the long-term stability, where the cycling behavior with a charge and discharge rate of 1 C is monitored over 100 cycles.

Example 2

Determination of the Cycling Behavior of Magnesium(II) bis(trifluoromethanesulfonyl)imide in an NMC Half-Cell:

The preparation of an electrolyte containing 1 M lithium hexafluorophosphate (LiPF$_6$) in a solvent mixture of ethylene carbonate and ethyl methyl carbonate (EC:EMC 1:1) with addition of 0.1 wt %, 0.7 wt % or 1 wt % of magnesium(II) bis(trifluoromethanesulfonyl) imide (Mg(TFSI)$_2$), and also of a comparative electrolyte without addition of Mg(TFSI)$_2$, took place as described under Example 1. The cycling behavior was determined using an NMC half-cell at constant current as described above.

FIG. 1 plots the discharge capacity against the number of cycles of 1 M LiPF$_6$ as solvent mixture of ethylene carbonate and ethyl methyl carbonate (EC:EMC 1:1) with and without addition of magnesium(II) bis(trifluoromethanesulfonyl)imide (Mg(TFSI)$_2$) in an NMC half-cell. As FIG. 1 shows, the addition of Mg(TFSI)$_2$ reduced the drop in the discharge capacity with increasing number of cycles (capacity fading). With increasing fraction of Mg(TFSI)$_2$, there was a slowdown in capacity fading, but the discharge capacity achieved in the initial cycles was also lower. The trade-off between fading rate and discharge capacity showed an optimum at a fraction of 0.7 wt % to 0.8 wt % of Mg(TFSI)$_2$.

Example 3

Determination of the Cycling Behavior of Magnesium-Sputter-Coated NMC:

a) Production of Magnesium-Sputter-Coated NMC Cathodes

Thin-layer magnesium dots were deposited by means of RF magnetron sputtering, using a 2-inch magnesium target, at a power of 30 W. In order to produce a dot pattern (3 mm, 2 mm, and 1 mm diameter), the NCM coated substrate was provided with a correspondingly perforated mask. The base pressure of the high-vacuum unit was 5×10$^{-8}$ mbar. At a working pressure of 5×10$^{-3}$ mbar, argon was used as process gas. Through the simultaneous coating of silicon wafers, the layer thickness of the magnesium dots was determined by profilometry. This layer thickness was determined as 500 nm or 1000 nm in each case for two cathodes.

b) Determination of the Cycling Behavior

The preparation of an electrolyte containing 1 M LiPF$_6$ in a solvent mixture of ethylene carbonate and ethyl methyl carbonate (EC:EMC 1:1) without addition of Mg(TFSI)$_2$ took place as described under Example 1. The cycling behavior was determined using an NMC half-cell at constant current as described above.

Figure 2:
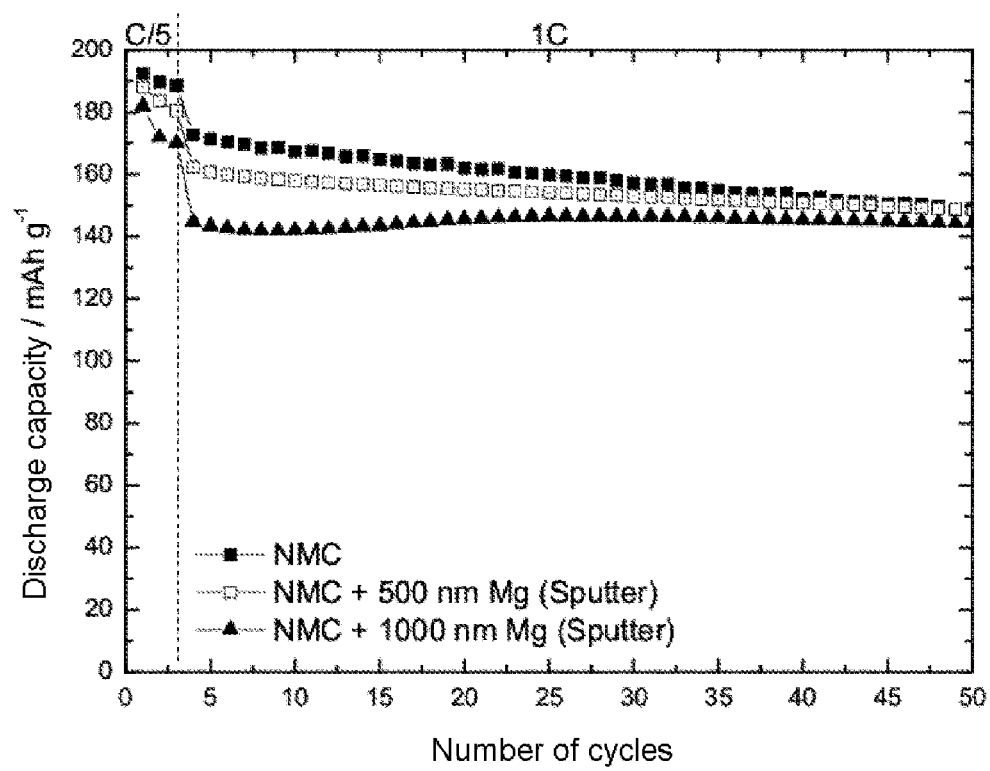
FIG. 2 shows the discharge capacity of a lithium-ion half-cell with 1 M lithium hexafluorophosphate ($LiPF_6$) in a solvent mixture of ethylene carbonate and ethyl methyl carbonate in equal mass fractions (EC:EMC 1:1 based on the mass) of an NMC electrode and Mg-sputter-coated NMC electrodes of different layer thickness. The cell was charged to an end-of-charge potential of 4.6 V versus Li/Li$^+$.

FIG. 2 shows the discharge capacity against the number of cycles of 1 M LiPF$_6$ in a solvent mixture of ethylene carbonate and ethyl methyl carbonate (EC:EMC 1:1) of an NMC electrode and of Mg-sputter-coated NMC electrodes with an Mg layer thickness of 500 nm and 1000 nm. As FIG. 2 shows, the increase in the Mg layer thickness reduced the capacity fading. At the same time, as the Mg layer thickness went up, the discharge capacity achieved in the initial cycles was also lower. This trade-off between fading rate and discharge capacity exhibits an optimum at an Mg layer thickness of between 500 nm and 1000 nm.

Example 4

Determination of the Cycling Behavior of Copper(II) bis(trifluoromethanesulfonyl)imide and Al (III) Trifluoromethanesulfonate in NMC Half-Cells:

The preparation of the electrolytes containing 1 M LiPF$_6$ in a solvent mixture of ethylene carbonate and ethyl methyl carbonate (EC:EMC 1:1) with addition of 0.1 wt % of Al(III) trifluoromethanesulfonate (Al(Otf)$_3$) or 1 wt % of copper(II) bis(trifluoromethanesulfonyl)imide (Cu(TFSI)$_2$) took place as described under Example 1. The cycling behavior was determined in an NMC-half cell at constant current as described above.

Figure 3:
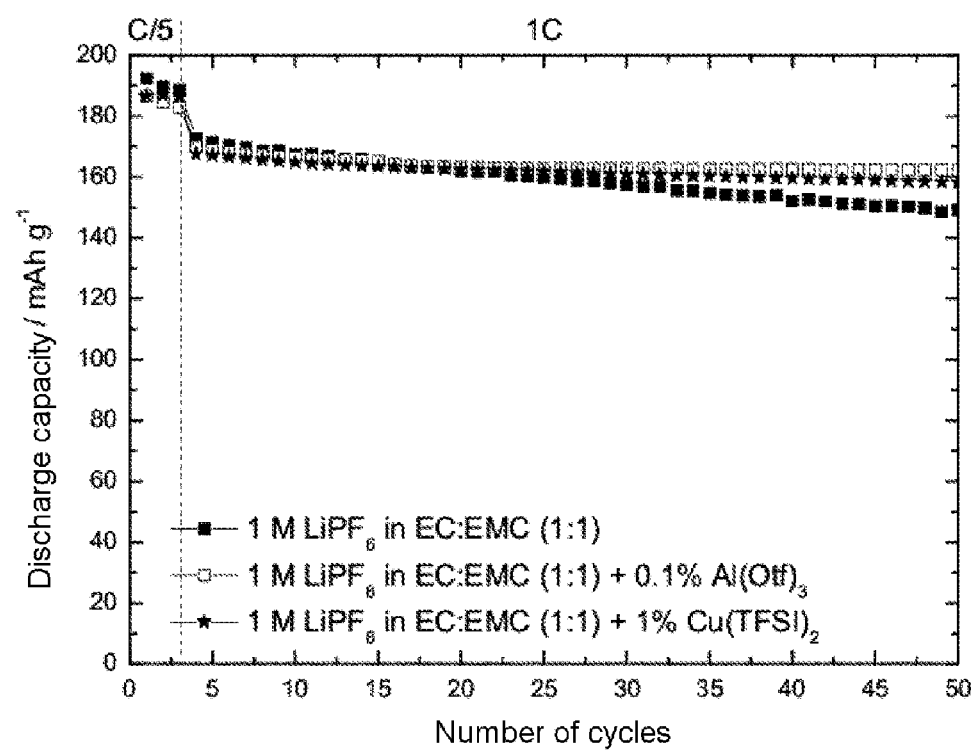
FIG. 3 shows the discharge capacity of a lithium-ion half-cell with 1 M lithium hexafluorophosphate ($LiPF_6$) in a solvent mixture of ethylene carbonate and ethyl methyl carbonate in equal mass fractions (EC:EMC 1:1 based on the mass), with and without addition of copper(II) bis(trifluoromethanesulfonyl)imide ($Cu(TFSI)_2$) and Al(III) trifluoromethanesulfonate ($Al(Otf)_3$). The working electrode used was the cathode material nickel manganese cobalt oxide (NMC). The cell was charged to an end-of-charge potential of 4.6 V versus Li/Li$^+$.

FIG. 3 shows the discharge capacity against the number of cycles of 1 M LiPF$_6$ in EC:EMC (1:1) with and without addition of Cu(TFSI)$_2$ and Al(Otf)$_3$ in an NMC half-cell. As can be seen from FIG. 3, the addition of Cu(TFSI)$_2$ and Al(Otf)$_3$ reduced the decrease in the discharge capacity with increasingly number of cycles (capacity fading).

Example 5 (Comparative)

Determination of the Cycling Behavior of Zinc(II) bis(trifluoromethanesulfonyl)imide in an NMC Half-Cell:

The preparation of electrolytes containing 1 M LiPF$_6$ in a solvent mixture of ethylene carbonate and ethyl methyl carbonate (EC:EMC 1:1) without or with addition of 0.1 wt % or 1 wt % of zinc(II) bis(trifluoromethanesulfonyl)imide (Zn(TFSI)$_2$) took place as described under Example 1. The cycling behavior was determined in an NMC half-cell at constant current as described above.

Figure 4:
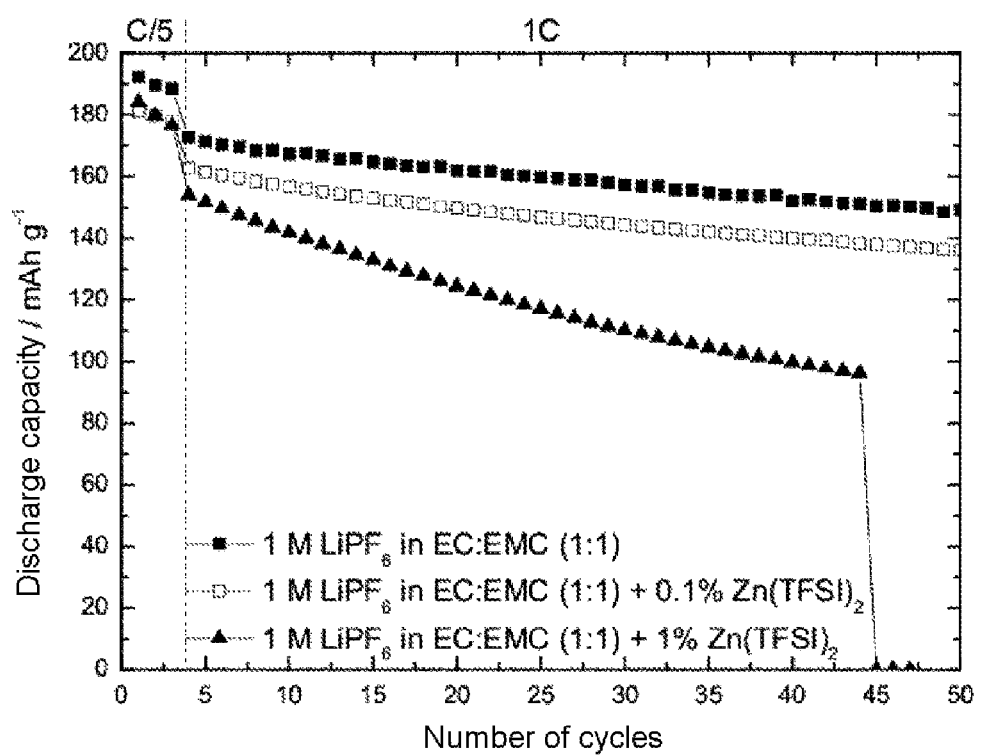
FIG. 4 shows, as a comparative experiment, the discharge capacity of a lithium-ion half-cell with 1 M lithium hexafluorophosphate ($LiPF_6$) in a solvent mixture of ethylene carbonate and ethyl methyl carbonate in equal mass fractions (EC:EMC 1:1 based on the mass), with and without addition of zinc(II) bis(trifluoromethanesulfonyl)imide (Zn $(TFSI)_2$). The working electrode used was the cathode material nickel manganese cobalt oxide (NMC). The cell was charged to an end-of-charge potential of 4.6 V versus Li/Li$^+$.

FIG. 4 shows the discharge capacity against the number of cycles of the electrolytes 1 M LiPF$_6$ in EC:EMC 1:1 with and without addition of Zn(TFSI)$_2$. As FIG. 4 shows, the addition of Zn(TFSI)$_2$ relative to the comparative electrolyte produced no reduction in the rate of decrease in the discharge capacity with increasing number of cycles (capacity fading). With increasing fraction of Zn(TFSI)$_2$, a lower discharge capacity and a greater capacity fading were produced. This shows that zinc is unsuited as an additive.

Example 6

Determination of the Cycling Behavior of Magnesium(II) bis(trifluoromethanesulfonyl)imide and Al(III) Trifluoromethanesulfonates in an LNMO Half-Cell:

The preparation of electrolytes containing 1 M LiPF$_6$ in a solvent mixture of ethylene carbonate and ethyl methyl carbonate (EC:EMC 1:1) without addition of additive or with 0.1 wt % of magnesium(II) bis(trifluoromethanesulfonyl)imide (Mg(TFSI)$_2$) or 0.2 wt % of Al(III) trifluoromethanesulfonate (Al(Otf)$_3$) took place as described under Example 1. The cycling behavior was determined in an LMNO half-cell at constant current as described above.

Figure 5:
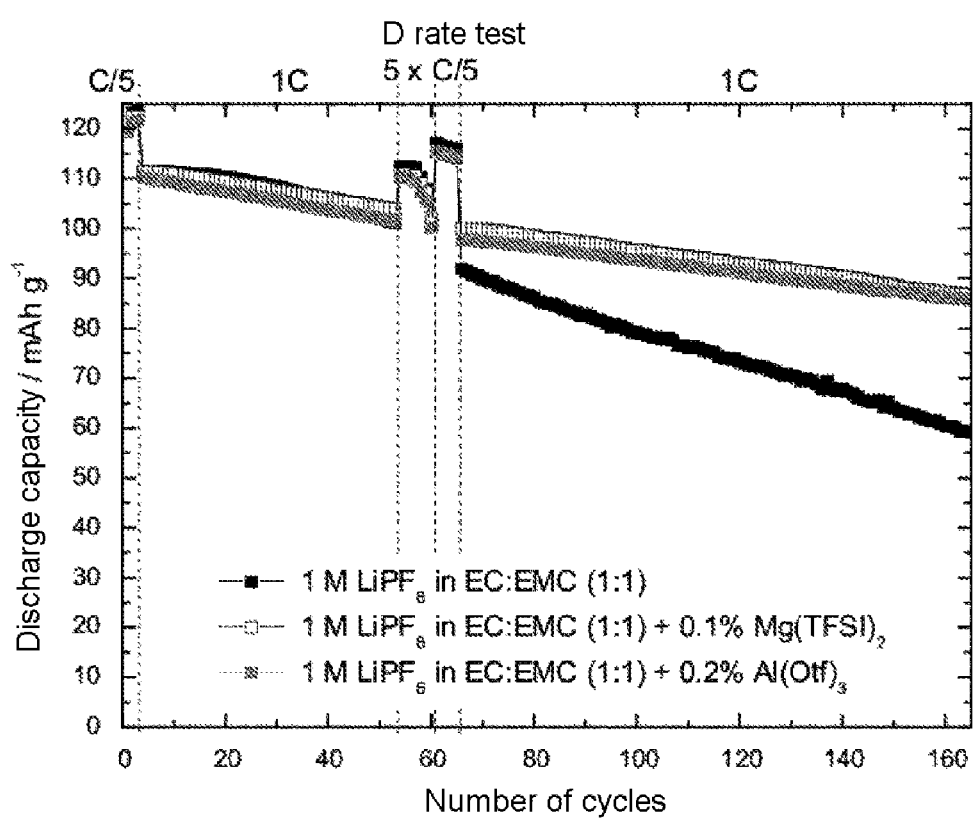
FIG. 5 shows the discharge capacity of a lithium-ion half-cell with 1 M lithium hexafluorophosphate ($LiPF_6$) in a solvent mixture of ethylene carbonate and ethyl methyl carbonate in equal mass fractions (EC:EMC 1:1 based on the mass), with and without addition of magnesium(II) bis (trifluoromethanesulfonyl)imide and Al(III) trifluoromethanesulfonates (Al(Otf)$_3$). The working electrode used was the cathode material lithium nickel manganese oxide (LNMO). The cell was charged to an end-of-charge potential of 4.95 V versus Li/Li$^+$.

FIG. 5 shows the discharge capacity against the number of cycles of 1 M LiPF$_6$ in EC:EMC 1:1 without addition of Mg(TFSI)$_2$ and Al(Otf)$_3$ in an LMNO half cell. As FIG. 5 shows, the addition of just 0.1 wt % of Mg(TFSI)$_2$ and also of 0.2 wt % of Al(Otf)$_3$ caused a reduction in capacity fading in both cases. The difference relative to the comparative electrolyte without Mg and/or Al salt becomes clear in particular with increasing number of cycles after the loading test (D rate test).

Example 7

Figure 6:
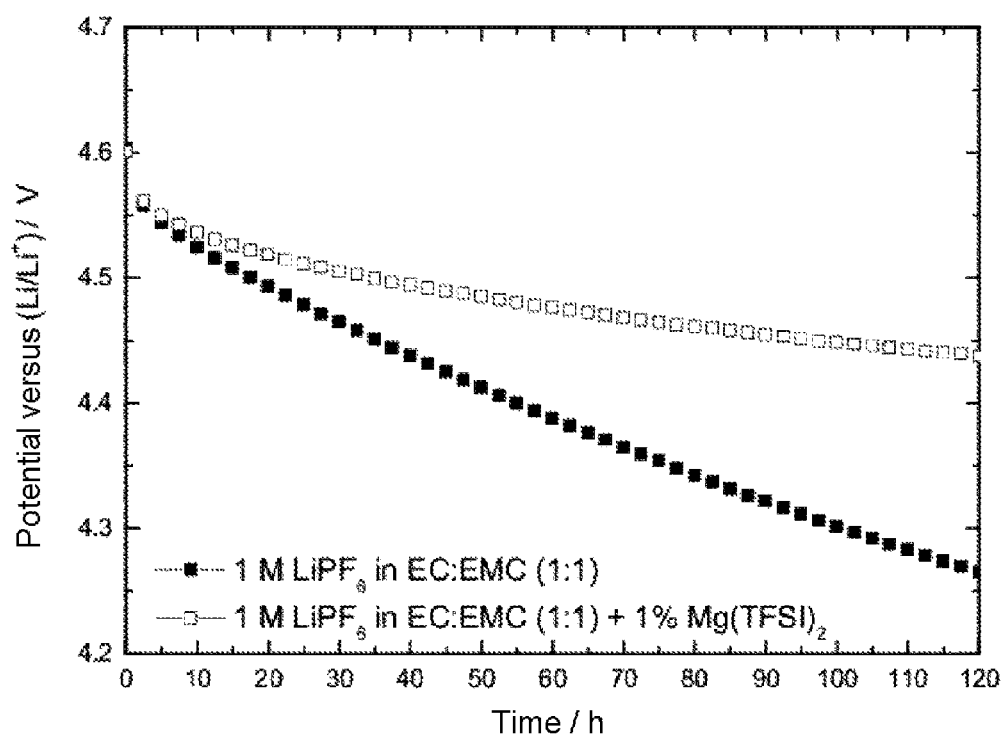
FIG. 6 shows the self-discharge of a lithium-ion half-cell with 1 M lithium hexafluorophosphate (LiPF$_6$) in a solvent mixture of ethylene carbonate and ethyl methyl carbonate in equal mass fractions (EC:EMC 1:1 based on the mass), with and without addition of magnesium(II) bis(trifluoromethanesulfonyl)imide (Mg(TFSI)$_2$). The working electrode used was the cathode material nickel manganese cobalt oxide (NMC). After three forming cycles with C/5, charging was carried out again to an end-of-charge potential of 4.6 V versus Li/Li$^+$, after which the open-circuit voltage (NMC versus reference) was monitored over time.

Measurement of the Self-Discharge of Magnesium(II) bis(trifluoromethanesulfonyl)imide in an NMC Half-Cell:

FIG. 6 shows the self-discharge of a lithium-ion half-cell with 1 M lithium hexafluorophosphate (LiPF$_6$) in a solvent mixture of ethylene carbonate and ethyl methyl carbonate (EC:ECM 1:1) with and without addition of 1 wt % of magnesium(II) bis(trifluoromethanesulfonyl)imide (Mg(TFSI)$_2$). The working electrode used was the cathode material nickel manganese cobalt oxide (NMC). The electrolytes were prepared and the cell constructed in accordance with Example 1 and as described above. After three forming cycles at C/5 in the potential range from 3.0 V to 4.6 V versus Li/Li$^+$, charging again took place up to an end-of-charge potential of 4.6 V against Li/Li$^+$, after which the open circuit voltage between the NMC electrode and the lithium reference electrode was monitored over time. As can be seen from FIG. 6, the addition of 1 wt % of Mg(TFSI)$_2$ reduced the self-discharge.

Example 8

Figure 7:
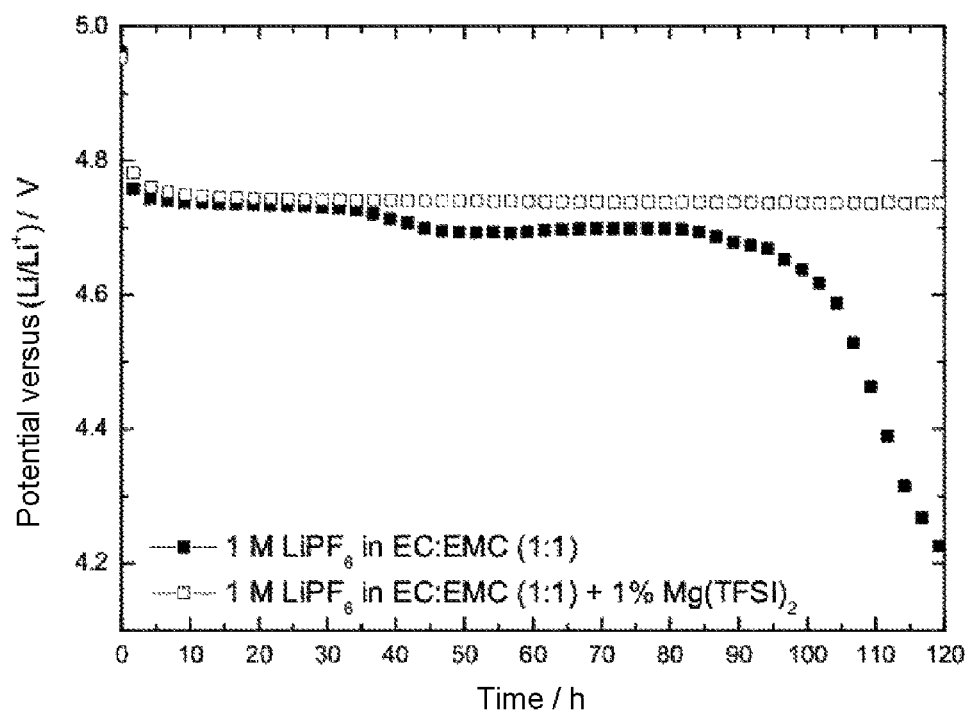
FIG. 7 shows the self-discharge of a lithium-ion half-cell with 1 M lithium hexafluorophosphate (LiPF$_6$) in a solvent mixture of ethylene carbonate and ethyl methyl carbonate in equal mass fractions (EC:EMC 1:1 based on the mass), with and without addition of magnesium(II) bis(trifluoromethanesulfonyl)imide (Mg(TFSI)$_2$). The working electrode used was the cathode material lithium nickel manganese oxide (LNMO). After 3 forming cycles with C/5, charging was carried out again to an end-of-charge potential of 4.95 V versus Li/Li$^+$, after which the open-circuit voltage (OCV) was monitored over time.

Measurement of the Self-Discharge of Magnesium(II) bis(trifluoromethanesulfonyl)imide in an LMNO Half-Cell:

FIG. 7 shows the self-discharge of a lithium-ion half-cell with 1 M lithium hexafluorophosphate (LiPF$_6$) in a solvent mixture of ethylene carbonate and ethyl methyl carbonate (EC:ECM 1:1) with and without addition of 1 wt % of magnesium(II) bis(trifluoromethanesulfonyl)imide (Mg(TFSI)$_2$). The working electrode used was the cathode material lithium nickel manganese oxide (LNMO). The electrolytes were prepared and the cell constructed in accordance with Example 1 and as described above. After three forming cycles at C/5 in the potential range from 3.0 V to 4.95 V versus Li/Li$^+$, charging again took place up to an end-of-charge potential of 4.95 V against Li/Li$^+$, after which the open circuit voltage between the LMNO electrode and the lithium reference electrode was monitored over time. As FIG. 7 shows, the addition of 1 wt % of Mg(TFSI)$_2$ reduced the self-discharge. The profile of the self-discharge follows the course of the discharge curve of the cathode material.

Example 9

Determination of the metal concentration of manganese, cobalt, and nickel in the electrolyte after four-week calendrical aging of NMC electrodes. NMC electrodes exhibit increased discharge capacity at elevated potentials. However, this discharge capacity reduces as the number of charging cycles goes up (fading). The incidence and also the extent of this fading are associated with the break-up of metal in the active material. In order to investigate the effect of the electrolyte with and without additive on the NMC active material, the corresponding metals, nickel, cobalt, and manganese, were quantified analytically by means of ICP-OES (optical emission spectrometer with inductively coupled plasma).

Cycling took place with the electrolyte containing 1 M lithium hexafluorophosphate (LiPF$_6$) in a solvent mixture of ethylene carbonate and ethyl methyl carbonate (EC:EMC 1:1) with and without addition of 1 wt % of magnesium(II) bis(trifluoromethanesulfonyl)imide (Mg(TFSI)$_2$). The electrolytes were prepared and the cell constructed in accordance with Example 1 and as described above.

The cells, after three forming cycles at C/5 in the potential range from 3.0 V to 4.6 V versus Li/Li$^+$, were charged again to an end-of-charge potential of 4.6 V versus Li/Li$^+$. The NMC electrodes of both cells were uninstalled in a glovebox and stored in the electrolyte under analysis, 1 M LiPF$_6$ in EC:EMC (1:1) with and without addition of 1 wt % of Mg(TFSI)$_2$, in polypropylene vessels for four weeks (calendrical aging). After the aging, 400 µL of electrolyte were removed from the polypropylene vessels, 150 µL of HNO$_3$ and 4450 µL of MilliQ water were added, and the metal concentrations were determined by optical emission spectrometry with inductively coupled plasma (ICPOES) (SPECTRO ARCOS).

Table 1 below shows the concentration of manganese, cobalt, and nickel metal detected in the electrolytes with and without addition of Mg(TFSI)$_2$ after four-week calendrical aging of the nickel manganese cobalt oxide (NMC) electrodes charged at 4.6 V versus Li/Li$^+$.

TABLE 1

|  | Mn/ppb | Co/ppb | Ni/ppb |
|---|---|---|---|
| 1M LiPF$_6$ in EC EMC (1:1) | 1693 | 3793 | 2920 |
| 1M LiPF$_6$ in EC EMC (1:1) + 1% Mg(TFSI)$_2$ | 753 | 2554 | 2521 |

As can be seen from table 1, the addition of 1 wt % of Mg(TFSI)$_2$ to 1 M LiPF$_6$ in EC:EMC (1:1) greatly reduced the metal break-up of the NMC active material. Consequently, Mg(TFSI)$_2$ is highly suitable for improving the compatibility of the NMC active material at elevated voltages and hence for allowing higher gravimetric or volumetric energies of the NMC-based energy storage system.

Example 10

Measurement of the Concentration Profile for Magnesium in a Lithiated and in a Delithiated Nickel Manganese Cobalt Oxide (NMC) Electrode.

Cycling was carried out with the electrolyte 1 M lithium hexafluorophosphate (LiPF$_6$) in a solvent mixture of ethylene carbonate and ethyl methyl carbonate (EC:EMC 1:1) with 1 wt % of magnesium(II) bis(trifluoromethanesulfonyl) imide (Mg(TFSI)$_2$). Preparation of the electrolyte and construction of the cell took place in accordance with Example 1 and as described above. For the lithiated cell, charging and discharging (formation) was carried out three times in the potential range from 3.0 V to 4.6 V versus Li/Li$^+$, at C/5. The lithiated cell gave a potential of 3.0 V versus Li/Li$^+$. For the delithiated cell, after the formation, charging took place again to an end-of-charge potential of 4.6 V versus Li/Li$^+$. The NMC electrodes of both cells were subsequently uninstalled in a glovebox and washed in each case with 1 mL of dimethyl carbonate in order to remove adhering residues of electrolyte and separator. The solvent was removed in the glovebox lock under reduced pressure.

Laser ablation-inductively coupled plasma-mass spectrometry (LA-ICP-MS) was used to investigate the concentration profile for magnesium in the NMC electrodes. By removal of material with a laser (Cetac LSX 213) and by means of an inductively coupled plasma, which served as a source of ions for a mass spectrometer (Agilent Technologies 7700x ICP-MS), the profile of the magnesium signal (m/z: 24, corresponding to $^{24}$Mg) was recorded at randomly selected points on the electrode surface in the direction of the current collector. Each laser shot removed a layer of approximately 0.5-2 μm (dependent on material) and recorded it individually. The signal was corrected by means of an internal standard ($^{59}$Co).

Figure 8:
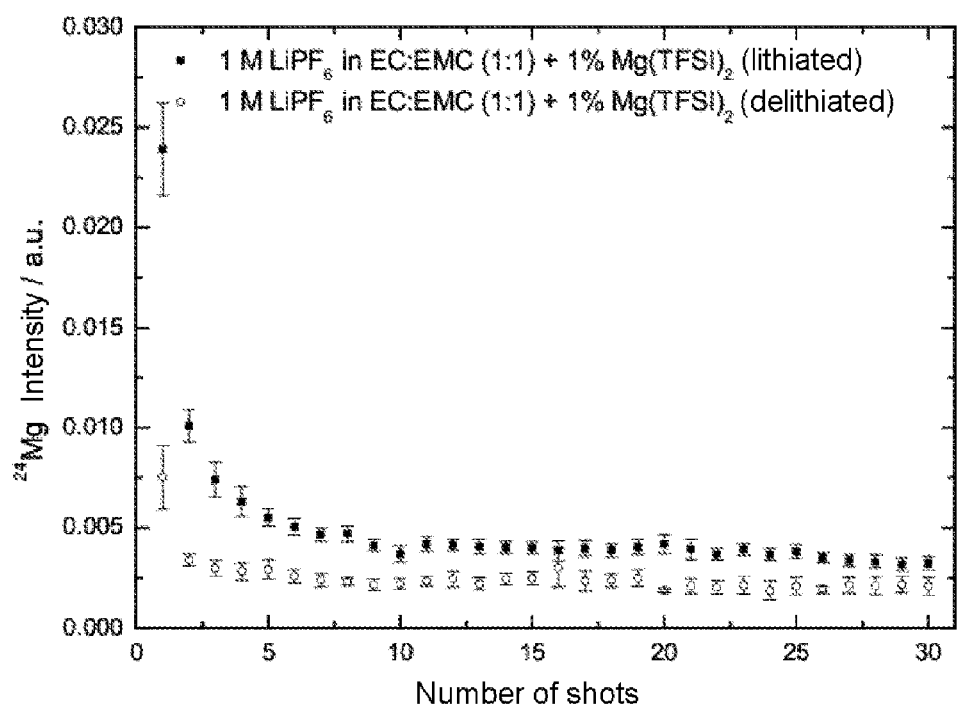
FIG. 8 shows the concentration profile for magnesium in a lithiated and in a delithiated nickel manganese cobalt oxide (NMC) electrode after 3 forming cycles at C/5. The concentration profile was determined by means of laser ablation-inductively coupled plasma-mass spectrometry (LA-ICP-MS). Cycling took place with the electrolyte 1 M lithium hexafluorophosphate (LiPF$_6$) in a solvent mixture of ethylene carbonate and ethyl methyl carbonate in equal mass fractions (EC:EMC 1:1 based on the mass) with 1 wt % of magnesium(II) bis(trifluoromethanesulfonyl)imide (Mg(TFSI)$_2$).

FIG. 8 shows the concentration profile for magnesium of both NMC electrodes, lithiated and delithiated. As the number of shots increased, the Mg concentration fell in both cases, and there is no evidence of a bi-modal concentration profile, which suggests that Mg is present only on the surface. In the case of the lithiated electrode, the Mg concentration is higher, indicating that in this case the outer layer which forms is thicker.

Example 11

Determination of the Cycling Behavior of NCM as Cathode Active Material with and without Magnesium Powders and Magnesium Salts Added During Production of the Cathode:

a) Production of NMC Cathodes Containing Small Fractions of Magnesium Powders and Magnesium Salts in Place of the Cathode Active Material The composite electrodes on the cathode side consist of 85 wt % of NCM active material, 8 wt % of PVdF binder, and 7 wt % of Super C65 conductivity additive. In the case of the addition of magnesium powders and magnesium salts, the composite electrodes consist of 85-x wt % of NCM active material, 8 wt % of PVdF binder, 7 wt % of Super C65 conductivity additive, and x wt % of magnesium powder and/or magnesium salt. For electrode processing, PVdF was first of all dissolved completely in N,N-dimethylformamide (DMF) and the solution was then added to a mixture of NMC active material and conductivity additive. The suspension thus obtained was homogenized using a planetary mill and was applied thinly (50 m film thickness) using a four-way bar applicator to the aluminum current collector. After preliminary drying and punching of the electrodes (12 mm diameter), drying took place at 120° C. under an oil pump vacuum in a glass oven.

b) Determination of the Cycling Behavior

An electrolyte containing 1 M LiPF$_6$ in a solvent mixture of ethylene carbonate and ethyl methyl carbonate (EC:EMC 1:1) without addition of Mg(TFSI)$_2$ was prepared as described under Example 1. The cycling behavior was determined in half-cells at constant current as described above.

Figure 9:
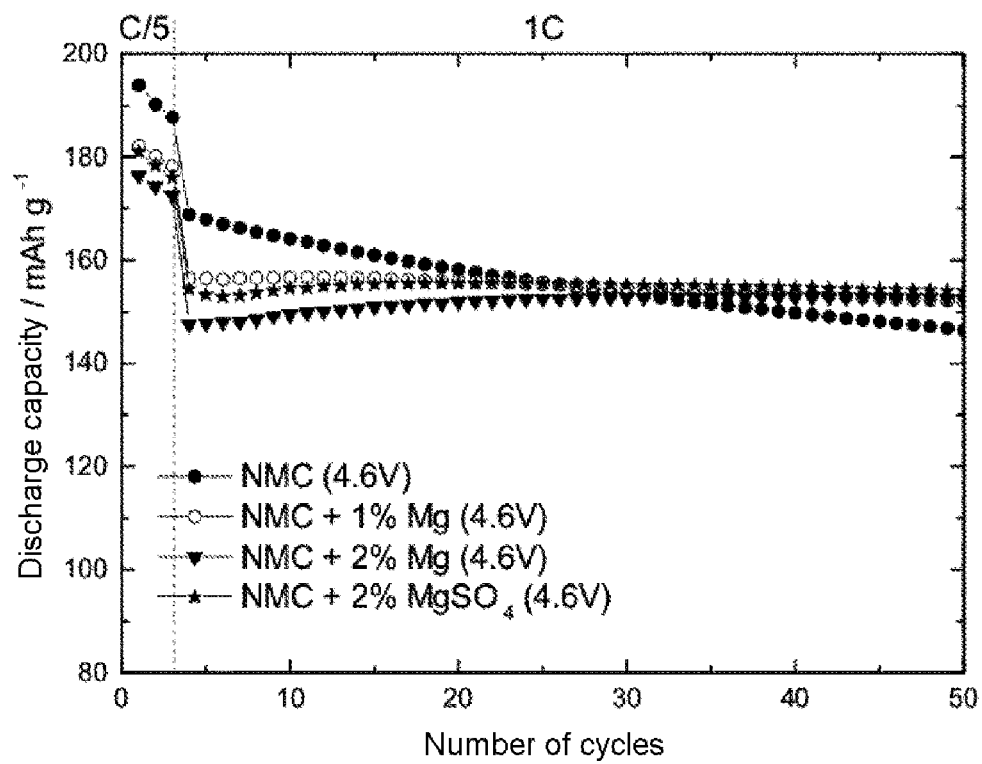
FIG. 9 shows the effect of magnesium powders and magnesium salts in lithium half-cells with NMC as cathode active material. The plot is of the number of cycles versus the discharge capacity in mAh g$^{-1}$. Cycling took place with the electrolyte 1 M lithium hexafluorophosphate (LiPF$_6$) in a solvent mixture of ethylene carbonate and ethyl methyl carbonate in equal mass fractions (EC:EMC 1:1 based on the mass). Through addition of 1 to 2 wt % of Mg powder or magnesium sulfate, introduced into the composite electrode instead of the cathode active material, there was indeed a reduction in discharge capacity as the amount of the addition went up, but at the same time cycling was more stable.

FIG. 9 shows the discharge capacity against the number of cycles of 1 M LiPF$_6$ in a solvent mixture of ethylene carbonate and ethyl methyl carbonate (EC:EMC 1:1) of an NMC electrode with and without addition of 1 to 2 wt % of Mg powder or magnesium sulfate in place of the NCM active material. As shown by FIG. 9, the addition of Mg powder or magnesium sulfate reduces the capacity fading. At the same time, however, the discharge capacity achieved in the initial cycles is also lower.

Example 12

Figure 10A:
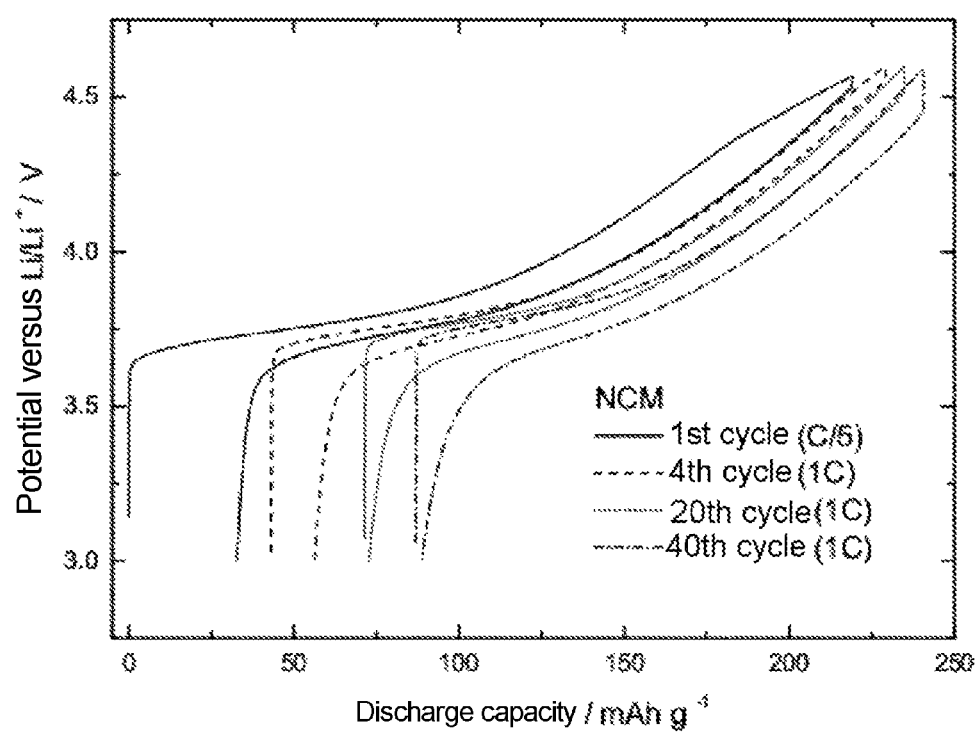
FIGS. 10A and 10B show investigations on the internal resistance in lithium half-cells with NMC as cathode active material, with and without magnesium sulfate added (2 wt %) during the production of the cathode. The plot is of the discharge capacity in mAhg$^{-1}$ against the potential versus Li/Li$^+$ in V. For both cases the first, fourth, tenth and 40th charge/discharge cycles are shown each time. The first charge/discharge cycle was carried out at a rate of C/5, the others at 1 C. Without addition of magnesium sulfate, increasing numbers of cycles were accompanied by a rise in the hysteresis ("ohmic drop"), whereas the hysteresis with addition of magnesium sulfate is greatest for the first cycle and drops after forming (cycle 4). This indicates that with addition of magnesium sulfate, an effective passivation layer is formed initially, which prevents further decomposition of the electrolyte. Without addition of magnesium sulfate, conversely, there is increasing thickening of the passivating layer, attributable to decomposition of electrolyte and leaching of metals from the active cathode material.
Figure 10B:
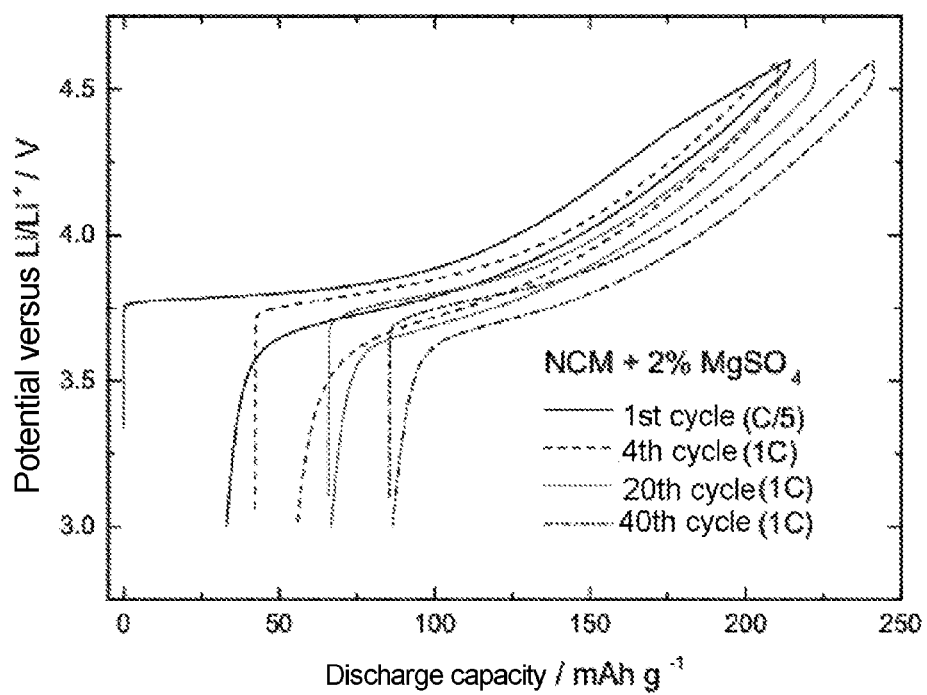

Investigation of the Internal Resistance of NCM as Cathode Active Material with and without Magnesium Powders and Magnesium Salts Added During Production of the Cathode:

An electrolyte containing 1 M LiPF$_6$ in a solvent mixture of ethylene carbonate and ethyl methyl carbonate (EC:EMC 1:1) without addition of Mg(TFSI)$_2$ was prepared as described under Example 1. The NCM composite electrodes with and without magnesium powders and magnesium salts added during production of the cathode were prepared as described in Example 11. The determination of the cycling behavior took place in half-cells at constant current as described above. FIG. 10 shows in each case the first, fourth, tenth, and 40$^{th}$ charge/discharge cycle of NCM half-cells with and without magnesium sulfate added (2 wt %) during production of the cathode. The first charge/discharge cycle here was carried out at a rate of C/5, the others at 1 C. Without addition of magnesium sulfate, an increasing number of cycles was accompanied by a rise in the hysteresis at the switching point ("ohmic drop"), whereas with addition of magnesium sulfate the hysteresis is greatest for the first cycle after formation (4$^{th}$ cycle) and decreases as the number of cycles goes up. This indicates that with addition of magnesium sulfate, an effective passivating layer is initially formed, which prevents further decomposition of the electrolyte. Without addition of magnesium sulfate, in contrast, there is increasing thickening of the passivating layer, attributable to electrolyte decomposition and leaching of metals from the active cathode material.

Example 13

Measurement of the Self-Discharge of NCM as Cathode Active Material with and without Magnesium Powders and Magnesium Salts Added During Production of the Cathode:

Preparation of the electrolytes and electrodes and construction of cells took place in accordance with Example 1 and as described above. The test procedure was as described in Example 7.

Figure 11:
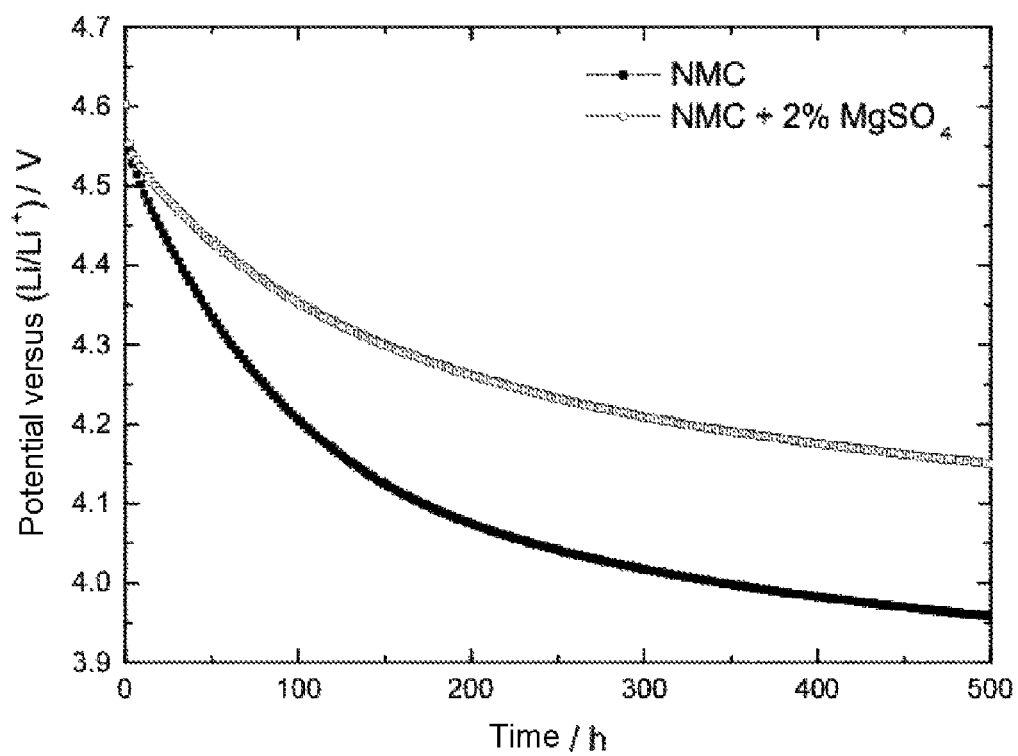
FIG. 11 shows the effect of magnesium powders and magnesium salts on the self-discharge of NCM (4.6 V). The plot is of the time in h against the potential versus Li/Li$^+$ in V. The upper curves shows a self-discharge curve, carried out with a cell in which the active cathode material had been admixed during production of the cathode with 2 wt % of MgSO$_4$. The lower curve shows a discharge curve of a cell in which the NCM cathode contained no magnesium addition. With addition of magnesium sulfate there was a distinct reduction in self-discharge.

FIG. 11 shows the self-discharge of a lithium-ion half-cell with 1 M lithium hexafluorophosphate (LiPF$_6$) in a solvent mixture of ethylene carbonate and ethyl methyl carbonate (EC:EMC 1:1) of NCM half-cells with and without magnesium sulfate added (2 wt %) during production of the cathode. The addition of 2 wt % of magnesium sulfate reduces the self-discharge, suggesting the formation of an effective outer layer on the electrode surface.

Example 14

Determination of the Cycling Behavior of NCM as Cathode Active Material with and without Metal Oxides Added During Production of the Cathode:

An electrolyte containing 1 M LiPF$_6$ in a solvent mixture of ethylene carbonate and ethyl methyl carbonate (EC:EMC 1:1) without addition of Mg(TFSI)$_2$ was prepared as described under Example 1. Preparation of the NCM composite electrodes with and without magnesium powders and metal salts added during production of the cathode took place as described in Example 11. The cycling behavior was determined in half-cells at constant current as described above.

Figure 12:
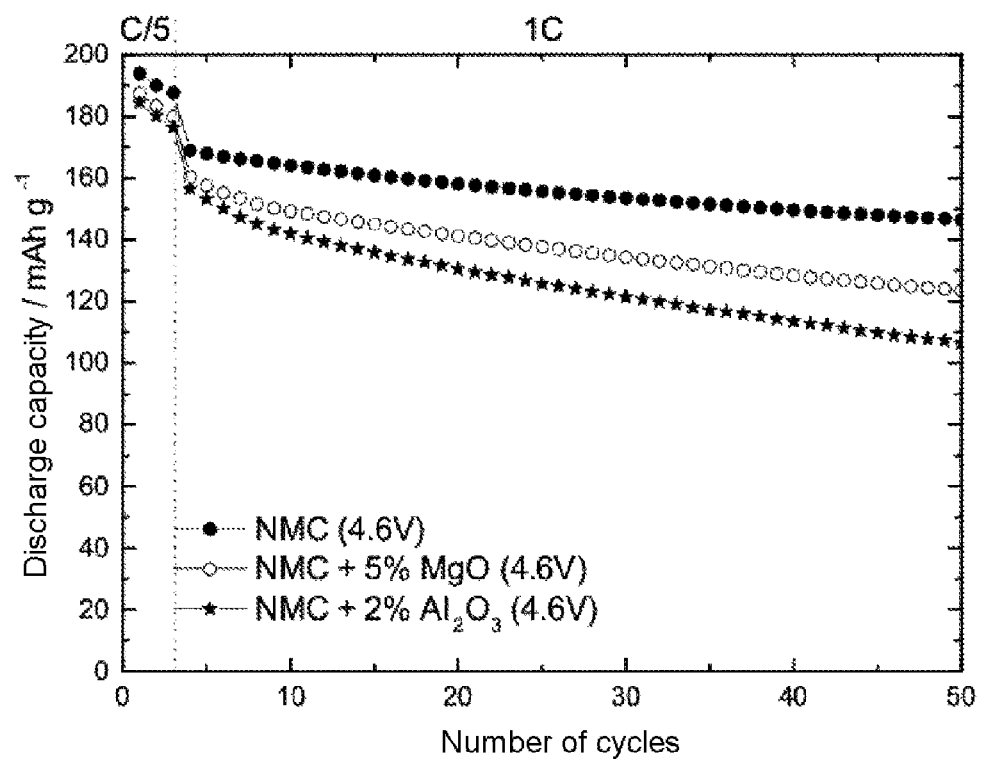
FIG. 12 shows, as a comparative experiment, the effect of metal oxides in lithium half-cells with NCM as cathode active material, with 1 M lithium hexafluorophosphate (LiPF$_6$) in a solvent mixture of ethylene carbonate and ethyl methyl carbonate in equal mass fractions (EC:EMC 1:1 based on the mass). The plot is of the number of cycles against the discharge capacity in mAhg$^{-1}$. By addition of 2 to 5 wt % of metal oxide, introduced into the composite electrode instead of the cathode active material, no improvement was found in the cycling stability.

FIG. 12 shows the discharge capacity against the number of cycles of 1 M LiPF$_6$ in a solvent mixture of ethylene carbonate and ethyl methyl carbonate (EC:EMC 1:1) of an NMC electrode with and without addition of 2 to 5 wt % of metal oxides in place of the NCM active material. As FIG. 9 shows, the addition of metal oxides does not result in stable cycling. Metal oxides are therefore not suitable for improving the high-voltage stability.

The overall outcome of these results is that an additive selected from a cation or a compound of a metal selected from Mg, Al, Cu and/or Cr, and/or a cathode bearing an applied metal selected from Mg, Al, Cu and/or Cr in the form of a metal powder or a metal salt, or the use thereof for partial replacement of the active material in the composite electrode, more particularly composite cathode, reduce the capacity fading and the self-discharge and therefore prolong the cycling stability or lifetime of alkali metal-ion batteries, more particularly lithium-ion batteries.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A composite electrode for an alkali metal-based energy storage system, the composite electrode comprising:
   a support bearing at least one applied or deposited active material,
   wherein a metal selected from the group consisting of Mg, Al, Cu and Cr is applied onto the active material and/or the active material in the composite electrode is partially replaced by the metal selected from the group consisting of Mg, Al, Cu and Cr in the form of a metal powder or a metal salt, and
   wherein the composite electrode is a cathode which is an electrode that accepts electrons on connection to a consumer and the alkali metal is lithium.

2. The composite electrode of claim 1, wherein the active material is a material stable to high voltage of ≥4.4 V and is selected from lithium nickel manganese cobalt mixed oxide, lithium metal manganese oxide or lithium-rich transition-metal oxides.

3. An alkali metal-based energy storage system, the system comprising:
   at least one composite electrode comprising an active material, wherein the composite electrode is a cathode which is an electrode that accepts electrons on connection to a consumer, and
   an electrolyte comprising an alkali metal salt dissolved in an aprotic organic solvent, an ionic liquid and/or a polymer matrix,
   wherein the electrolyte further comprises an additive selected from a cation or a compound of a metal selected from the group consisting of Mg, Al, Cu and Cr,
   wherein the metal selected from the group consisting of Mg, Al, Cu and Cr is applied onto the active material, and/or the active material in the composite electrode is partially replaced by the metal selected from the group consisting of Mg, Al, Cu and Cr in the form of a metal powder or a metal salt, and
   wherein the alkali metal is lithium.

4. The system of claim 3, wherein the metal for the additive selected from the group consisting of Mg, Al, Cu and Cr takes the form of a cation of a magnesium, aluminum, copper and/or chromium salt in conjunction with an anion selected from $AsF_6^-$, $ClO_4^-$, $SbF_6^-$, $PtCl_6^-$, $AlCl_4^-$, $GaCl_4^-$, $SCN^-$, $AlO_4^-$, $CF_3CF_2SO_3^-$, $(CF_3)SO_3^-$, $C(SO_2CF_3)_3^-$, $PF_6^-$, $PF_3(CF_3)_3^-$, $PF_4(C_2O_4)^-$, $BF_4^-$, $B(C_2O_4)_2^-$, $BF_2(C_2O_4)^-$, $B(C_2O_4)(C_3O_4)^-$, $(C_2F_5BF_3)^-$, $B_{12}F_{12}^{2-}$, $N(SO_2CF_3)_2^-$, $N(FSO_2)_2^-$ or $N(SO_2C_2F_5)_2^-$.

5. The system of claim 4, wherein the additive comprises the magnesium, aluminum, copper and/or chromium salt in the range from ≥0.1 ppm to ≤10 wt %, based on a total electrolyte weight of 100 wt %.

6. The system of claim 4, wherein the additive comprises the magnesium, aluminum, copper and/or chromium salt in the range from ≥0.01 wt % to ≤5 wt %, based on a total electrolyte weight of 100 wt %.

7. The system of claim 4, wherein the additive comprises the magnesium, aluminum, copper and/or chromium salt in the range from ≥0.1 wt % to ≤2 wt %, based on a total electrolyte weight of 100 wt %.

8. The system of claim 4, wherein the additive is magnesium (II) bis(trifluoromethanesulfonyl)imide or aluminum (III) trifluoromethanesulfonate.

9. A method for increasing the cycling stability of an alkali metal-based energy storage system comprising at least one composite electrode having an active material, and an electrolyte comprising a lithium salt dissolved in an aprotic organic solvent, an ionic liquid and/or a polymer matrix, the method comprising the steps of:
   admixing the electrolyte with an additive selected from a cation or a compound of a metal selected from the group consisting of Mg, Al, Cu and Cr,
   applying the metal selected from the group consisting of Mg, Al, Cu and Cr onto the active material, wherein the active material is selected from lithium nickel manganese cobalt mixed oxide, lithium nickel manganese oxide or lithium-rich transition-metal oxides, and/or
   partially replacing the active material by the metal selected from the group consisting of Mg, Al, Cu and Cr in the form of a metal powder or a metal salt, and
   wherein the composite electrode is a cathode which is an electrode that accepts electrons on connection to a consumer and the alkali metal is lithium.

10. The method of claim 9, wherein the metal selected from the group consisting of Mg, Al, Cu and Cr is applied onto the active material of the cathode by sputtering.

11. The method of claim 9, wherein the composite electrode is made from a collector and an active-material suspension comprising introducing the metal powder or the metal salt, into the active-material suspension by drying, and wherein no metal oxides are formed during the drying of the active-material suspension.

12. The method of claim 11, wherein the metal is magnesium.

13. The method of claim 11, wherein the metal powder or the metal salt is introduced into the active material suspension in an amount of 0.1 to 10 wt %.

14. The method of claim 11, wherein the metal powder or the metal salt is introduced into the active material suspension in an amount of 0.5 to 5 wt %.

15. The method of claim 11, wherein the metal powder or the metal salt is introduced into the active material suspension in an amount of 1 to 3 wt %.

* * * * *